Oct. 14, 1952 — E. J. HILLER — 2,613,642
CONTAINER FOR FEEDING SUCKLING CALVES
Filed Nov. 1, 1948
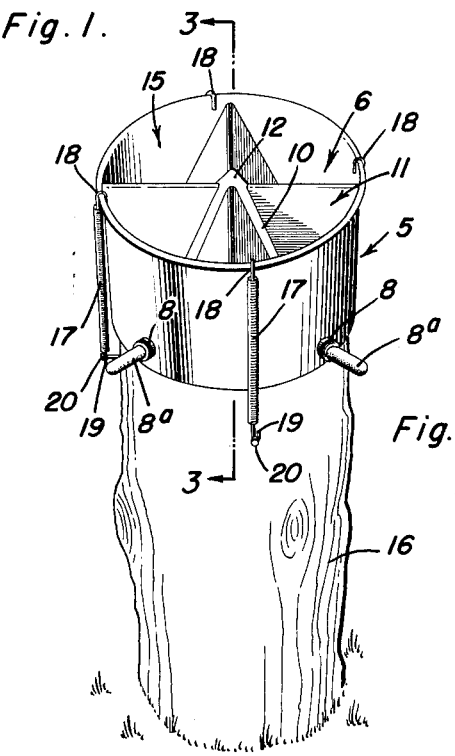
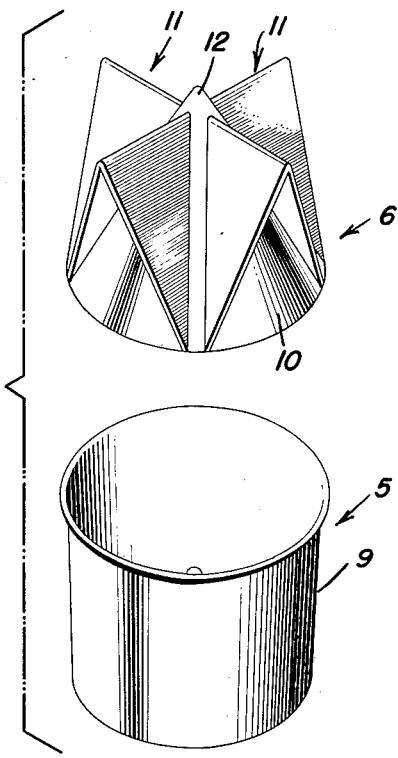
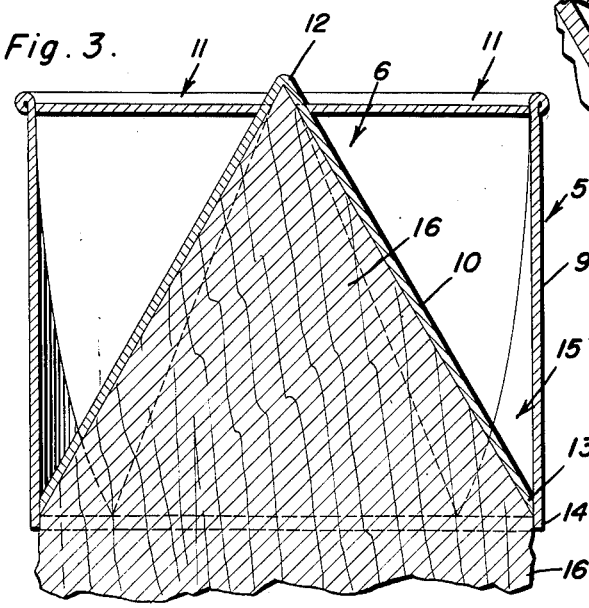
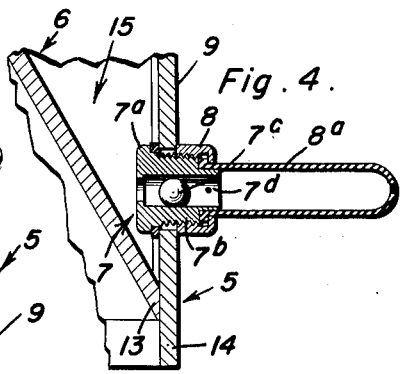
Erwin J. Hiller
INVENTOR.

Patented Oct. 14, 1952

2,613,642

UNITED STATES PATENT OFFICE 2,613,642

CONTAINER FOR FEEDING SUCKLING CALVES

Erwin J. Hiller, Cuero, Tex.

Application November 1, 1948, Serial No. 57,727

1 Claim. (Cl. 119—71)

The present invention relates to an especially constructed container which is primarily adapted to be used in dairies and by dairy farmers and others engaged in the raising of calves, particularly when the calves are, as is now common, practice, artificially suckled.

It is a matter of common knowledge that dairies and others engaged in the business of milking cows have found repeatedly, from experience, that milking cows, in a strictly business and economical sense, can be accomplished profitably only by weaning and taking the suckling calves from the mother cow and then raising the calves from buckets or containers with suitable nipples or by employing nursing bottles equipped with nipples.

It is common practice, as mentioned, to use nipple equipped containers of one type or another. What is more, many patents have been granted on varied types of nipple equipped containers. Such being the picture and with a view toward more successfully attaining wanted ends, I have evolved and produced what is believed to be an improved container having certain structural features and refinements not present, as far as I have been able to ascertain, in prior art devices.

It is an object of the invention to so design and construct my container that it may be adequately and reliably placed on a stump or other relatively fixed base and partly held in place on said stump through the instrumentality of springs or equivalent fastening devices, thus preventing the container from being knocked off of the base by suckling calves in spirited action.

In connection with the above it is to be stated that by nature and instinct, the suckling calf will push, shove and thrust its head upward in such a manner, during feeding, to easily upset or dislodge an ordinary unanchored bucket or container. Thus, the latter will be dislocated and hence it is a significant objective in the instant situation to utilize an appropriately fixed base and to mount the container on said base, as above stated, whereby to afford the calves the privilege of following instinctive feeding practices while, at the same time, preventing the container from being dumped and the contents spilled.

Another object of the invention is to provide a bucket-like container with an arrangement of partitions which are uniform and spaced at equidistant points to define individual compartments, each compartment to contain a predetermined amount of milk or other liquid so that each calf can and will get only the amount of liquid which should be properly apportioned to it.

A further object of the invention is that the container is so constructed that the suckling calf will entirely drain the amount of liquid therein apportioned to him by gravity and obviating the necessity of tilting or angling the container for reliable drainage.

Another objective has to do with the provision of a container which is such in construction that it may be easily and quickly sterilized so as to decrease the possibility of contamination and to preserve the good health of the calves, the construction being also such that the device may be easily stored, packed or crated for shipping and thereby made readily accessible to the user.

A still further object has to do with a container, the bottom portion of the wall of which has equi-distant circumferentially spaced holes to accommodate two-part readily attachable and detachable nipple units.

Other objects and advantages will become more readily apparent from the following description and the accompanying illustrative drawings.

In the drawings, wherein like numerals are employed to designate like parts throughout the views:

Figure 1 is a perspective view of a feeder type container constructed in accordance with the invention, showing the manner in which same is preferably used.

Figure 2 is a perspective view of the parts separated one from the other.

Figure 3 is a vertical section on an enlarged scale taken on the line 3—3 of Figure 1, looking in the direction of the arrows.

Figure 4 is an enlarged fragmentary sectional and elevational view detailing the nipple means.

Referring now to the drawings by reference numerals, the container is made up of two units, that is the unit 5 and complemental unit 6. The unit 5 is an annulus or rim which is open at the top and bottom and provided at circumferentially spaced points with equi-distant circumferentially spaced nipple holes to accommodate a marketed type nipple unit.

Said unit, as detailed in Figure 4, may now be purchased on the open market and while it is not claimed as such may be novel when used in association with nipple holes in said container. It comprises a fitting 7 having a centrally apertured head 7a carrying a screw threaded neck 7b, ball check valve 7c and spider 7d. Said neck serves to accommodate a screw collar 8 which, when in place, serves to attach the complemental nipple 8a.

Unit 5 is characterized by a sheet metal or equivalent annulus 9 of appropriate dimensions with nipple equipped discharge openings. The unit 6, which is the nature of an insert and is rigidly secured within the confines of the unit 5, comprises a cone 10 and a plurality of inverted V-shaped partitioning members 11 which are mounted on the exterior tapered surfaces of the cone at equi-distant and spaced points. The members 11 are spaced from each other and expose portions of the cone therebetween. The apex 12 of the cone extends above the upper bight or crotch portions of the inverted V-shaped members 11. The base portion of the cone is secured in the annulus as at 13 in Figure 4. Here, the point of anchorage is upwardly of the lower end of the annulus and thus the depending part of the annulus forms a ring-like skirt or apron 14. The vertex portions of the members 11 reside on a plane below the upper open end of the annulus. When the two units are secured together as shown in the drawings, they define individual pockets or compartments which are denoted by the numerals 15. There are four of these compartments and they each have the desired capacity for one feeding of one calf.

Not only does the cone 10 serve as a mount for the members 11, functioning in conjunction with the latter as a divider or partitioning element, but it also facilitates placement and maintenance of the device on a stump or other fixed support 16 as shown in Figures 1 and 3. If desired, the upper portion of the stump may be tapered to fit up into the cone, thus permitting the container to telescope over said stump. Lateral displacement of the container is thus prevented. Further, secure maintenance of the container on the stump is obtained through the use of several or more coiled springs 17. Each spring has its upper hook 18 engaged over the upper lip portion of the container. The lower hook or eye, as the case may be, denoted at 19, is secured to a nail or other headed fastener 20 which is driven into the stump. Consequently, the springs assist the holding of the container on the stump. This means that the tendency of the animals to unseat the container by upward lifting thrusts is minimized and by preventing lateral or horizontal displacement, there is very little likelihood that the device will be accidentally dislodged from the stump.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

Means for simultaneously feeding a plurality of suckling animals comprising a container embodying an annular rim open at upper and lower end portions, a hollow cone fitted vertically and concentrically within the confines of said rim, the lower end portion of said rim depending below the base of the cone and providing an endless skirt, a plurality of inverted V-shaped dividers arranged at equidistant circumferentially spaced points in the space between said cone and inward surface of the surrounding rim and secured respectively to the cone and rim and coacting therewith in defining individual feeder compartments, the rim at the lower end portion of each compartment being provided with a discharge opening, and nipples removably mounted in the respective discharge openings, said nipples projecting radially beyond the outer surface of the rim.

ERWIN J. HILLER.

REFERENCES CITED

The following references are of record in the file of this patent:

UNITED STATES PATENTS

| Number | Name | Date |
|---|---|---|
| 415,742 | Sherman | Nov. 26, 1889 |
| 476,310 | Reed | June 7, 1892 |
| 585,486 | Snow | June 29, 1897 |
| 992,107 | Brown | May 9, 1911 |
| 997,248 | Freeman | July 4, 1911 |
| 1,138,141 | Oliver | May 4, 1915 |
| 1,171,742 | Meyer | Feb. 15, 1916 |
| 1,301,416 | Foster | Apr. 22, 1919 |
| 1,385,510 | Ward | July 26, 1921 |
| 1,452,558 | Jackson | Apr. 24, 1923 |
| 1,667,785 | Hill | May 1, 1928 |
| 1,733,066 | Lyles | Oct. 22, 1929 |
| 1,769,042 | Short | July 1, 1930 |
| 2,158,226 | Elsey | May 16, 1939 |

FOREIGN PATENTS

| Number | Country | Date |
|---|---|---|
| 450,717 | France | Jan. 25, 1913 |
| 51,263 | Denmark | Feb. 1, 1936 |